United States Patent
Naik et al.

(10) Patent No.: US 11,563,398 B1
(45) Date of Patent: Jan. 24, 2023

(54) SYSTEMS AND METHODS FOR CONTROLLING INVERTER HAVING SHUTOFF CIRCUIT

(71) Applicant: Delphi Technologies IP Limited, St Michael (BB)

(72) Inventors: Karthik Naik, Bedok (SG); Miang Keng Yoon, Geylang (SG); Neil van Zyl, Amboy, IN (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 0 days.

(21) Appl. No.: 17/448,626

(22) Filed: Sep. 23, 2021

(51) Int. Cl.
  *H02P 27/08* (2006.01)
  *H02P 29/028* (2016.01)

(52) U.S. Cl.
  CPC ............ *H02P 27/08* (2013.01); *H02P 29/028* (2013.01)

(58) Field of Classification Search
  CPC .... H02P 29/68; H02P 29/0241; H02P 29/026; H02P 3/12; H02P 29/024; H02P 29/028; H03K 17/0828; H03K 17/78; H03K 17/691; H03F 3/3086; H03F 1/52; H03F 3/26; H02H 7/1225
  See application file for complete search history.

(56) References Cited

U.S. PATENT DOCUMENTS 10,442,309 B2  10/2019 Goetz
2013/0314014 A1* 11/2013 Tremel ............ H02M 7/53871
                                                318/400.22
2014/0184200 A1   7/2014 Milano et al.
2019/0372505 A1* 12/2019 Chen ................. H02P 6/12
2020/0350903 A1  11/2020 Gu et al.
2021/0006195 A1*  1/2021 Maeda ............... H02M 7/797
2021/0119627 A1*  4/2021 Lee ................... H03K 17/06

OTHER PUBLICATIONS

Antoine Dubois and Erik Santiago, "Safely controlling an EV traction inverter", May 18, 2020, https://www.embedded.com/safely-controlling-an-ev-traction-inverter/ (7 pages).
Pauline Wang et al. "Automotive Safety Design Concept", https://training.ti.com/sites/default/files/pmic_safety_detroit_techday.pdf, 2019 (61 pages).
Bhavan R et al. "Functional safety requirements of traction inverter in accordance to ISO 26262", E3S Web Conf. vol. 184, 2nd International Conference on Design and Manufacturing Aspects for Sustainable Energy (ICMED 2020) (5 pages).

* cited by examiner

*Primary Examiner* — Said Bouziane
(74) *Attorney, Agent, or Firm* — Joshua M. Haines; Bookoff McAndrews, PLLC (57) ABSTRACT

A system includes a control board comprising: a microprocessor configured to output a PWM signal; a primary shutoff path circuit, an upper MOSFET shutoff circuit, and a lower MOSFET shutoff circuit, each of the circuits configured to receive the PWM signal; a first buffer provided at an output of the primary shutoff path circuit; a second buffer provided at an output of the upper MOSFET shutoff circuit; a third buffer provided at an output of the lower MOSFET shutoff circuit; a first resistor and a second resistor provided in parallel at the first buffer and configured to provide a first feedback signal; a third resistor and a fourth resistor provided in parallel at the second buffer and configured to provide a second feedback signal; and a fifth resistor and a sixth resistor provided in parallel at the third buffer and configured to provide a third feedback signal.

20 Claims, 6 Drawing Sheets

SYSTEMS AND METHODS FOR CONTROLLING INVERTER HAVING SHUTOFF CIRCUIT

TECHNICAL FIELD

Various embodiments of the present disclosure relate generally to systems and methods for controlling an inverter having a shutoff circuit, and, more particularly, to providing a safety mechanism with minimal additional hardware to meet ASIL-D requirements for an inverter.

INTRODUCTION

Recently, the electronics dependency in automobiles has increased. Safety is a fundamental requirement in automotive systems to guarantee a tolerable level of risk. For the automotive industry, the ISO 26262 standard is used, which is a functional safety standard developed by the International Organization for Standardization (ISO). According to ISO 26262, functional safety is defined as the absence of unreasonable risk due to hazards caused by malfunctioning behavior of electrical/electronic systems, and includes a risk classification scheme known as Automotive Safety Integrity Level (ASIL). There are different ASIL levels (ASIL-A, ASIL-B, ASIL-C, ASIL-D) as prescribed by the standard, with ASIL-A being the least stringent and ASIL-D being the most stringent.

SUMMARY OF THE DISCLOSURE

According to certain aspects of the disclosure, a system includes a control board for a direct-current (DC) to alternating current (AC) inverter, the control board comprising: a microprocessor configured to output a Pulse Width Modulation (PWM) signal; a primary shutoff path circuit configured to receive the PWM signal; an upper MOSFET shutoff circuit configured to receive the PWM signal; a lower MOSFET shutoff circuit configured to receive the PWM signal; a first buffer provided at an output of the primary shutoff path circuit; a second buffer provided at an output of the upper MOSFET shutoff circuit; a third buffer provided at an output of the lower MOSFET shutoff circuit; a first resistor and a second resistor provided in parallel at the first buffer and configured to provide a first feedback signal from the first buffer to the microprocessor; a third resistor and a fourth resistor provided in parallel at the second buffer and configured to provide a second feedback signal from the second buffer to the microprocessor; and a fifth resistor and a sixth resistor provided in parallel at the third buffer and configured to provide a third feedback signal from the third buffer to the microprocessor.

According to certain aspects of the disclosure, the microprocessor is configured to ignore the first feedback signal, the second feedback signal, and the third feedback signal during an initialization period when the inverter is initialized in a startup process.

According to certain aspects of the disclosure, the microprocessor is configured to monitor, following the initialization period, the first feedback signal, the second feedback signal, and the third feedback signal either continuously or at specific time intervals.

According to certain aspects of the disclosure, the first feedback signal, the second feedback signal, and the third feedback signal are in a low state during normal operation, and are in a high state when a fault occurs in any circuit on the control board prior to any of the first buffer, the second buffer, and the third buffer.

According to certain aspects of the disclosure, when one or more of the first feedback signal, the second feedback signal, or the third feedback signal indicates a fault, the microprocessor is configured to terminate PWM control.

According to certain aspects of the disclosure, the microprocessor is further configured to enable Active Short Circuit (ASC) mode or Free Wheeling (FW) mode based on a threshold value.

According to certain aspects of the disclosure, the threshold value is a speed of a motor controlled by the inverter.

According to certain aspects of the disclosure, the control board further comprises: a PWM circuit configured to receive the PWM signal from the microprocessor and output the PWM signal to the primary shutoff path circuit, the upper MOSFET shutoff circuit, and the lower MOSFET shutoff circuit; and a safety logic circuit configured to receive first control signals from the microprocessor and provide second control signals to the primary shutoff path circuit, the upper MOSFET shutoff circuit, and the lower MOSFET shutoff circuit.

According to certain aspects of the disclosure, a direct-current (DC) to alternating current (AC) inverter comprises the system described above; and a power board configured to receive PWM signals from the first PWM buffer, the second PWM buffer, and the third PWM buffer and generate alternating current (AC) power using the received PWM signals.

According to certain aspects of the disclosure, an electrical system comprises: the inverter described above; and a motor configured to receive the generated AC power from the power board of the inverter, and to rotate based on the received AC power.

According to certain aspects of the disclosure, a method for controlling a direct-current (DC) to alternating current (AC) inverter comprises: outputting, from a microprocessor of a control board of the inverter, a Pulse Width Modulation (PWM) signal; receiving, by a primary shutoff path circuit of the control board of the inverter, the PWM signal; receiving, by an upper MOSFET shutoff circuit of the control board of the inverter, the PWM signal; receiving, by a lower MOSFET shutoff circuit of the control board of the inverter, the PWM signal; receiving, by a first buffer of the control board of the inverter, an output of the primary shutoff path circuit; receiving, by a second buffer of the control board of the inverter, an output of the upper MOSFET shutoff circuit; receiving, by a third buffer of the control board of the inverter, an output of the lower MOSFET shutoff circuit; receiving, by the microprocessor, a first feedback signal from the first buffer by a first resistor and a second resistor provided in parallel at the first buffer; receiving, by the microprocessor, a second feedback signal from the second buffer by a third resistor and a fourth resistor provided in parallel at the second buffer; and receiving, by the microprocessor, a third feedback signal from the third buffer by a fifth resistor and a sixth resistor provided in parallel at the third buffer.

According to certain aspects of the disclosure, the method further comprises: ignoring, by the microprocessor, the first feedback signal, the second feedback signal, and the third feedback signal during an initialization period when the inverter is initialized in a startup process.

According to certain aspects of the disclosure, the method further comprises: monitoring, by the microprocessor following the initialization period, the first feedback signal, the second feedback signal, and the third feedback signal either continuously or at specific time intervals.

According to certain aspects of the disclosure, the method further comprises: wherein the first feedback signal, the second feedback signal, and the third feedback signal are in a low state during normal operation, and are in a high state when a fault occurs in any circuit on the control board prior to any of the first buffer, the second buffer, and the third buffer.

According to certain aspects of the disclosure, the method further comprises: terminating, by the microprocessor, PWM control when one or more of the first feedback signal, the second feedback signal, or the third feedback signal indicates a fault.

According to certain aspects of the disclosure, the method further comprises: enabling, by the microprocessor, Active Short Circuit (ASC) mode or Free Wheeling (FW) mode based on a threshold value.

According to certain aspects of the disclosure, the method further comprises, wherein the threshold value is a speed of a motor controlled by the inverter.

According to certain aspects of the disclosure, the method further comprises: receiving, by a PWM circuit of the control board, the PWM signal from the microprocessor and outputting the PWM signal to the primary shutoff path circuit, the upper MOSFET shutoff circuit, and the lower MOSFET shutoff circuit; and receiving, by a safety logic circuit of the control board, first control signals from the microprocessor and providing second control signals to the primary shutoff path circuit, the upper MOSFET shutoff circuit, and the lower MOSFET shutoff circuit.

According to certain aspects of the disclosure, the method further comprises: receiving, by a power board for the inverter, PWM signals from the first PWM buffer, the second PWM buffer, and the third PWM buffer and generating alternating current (AC) power using the received PWM signals.

According to certain aspects of the disclosure, a non-transitory computer readable medium stores instructions that, when executed by a control board for a direct-current (DC) to alternating current (AC) inverter, perform operations including: outputting, from a microprocessor of the control board of the inverter, a Pulse Width Modulation (PWM) signal; receiving, by a primary shutoff path circuit of the control board of the inverter, the PWM signal; receiving, by an upper MOSFET shutoff circuit of the control board of the inverter, the PWM signal; receiving, by a lower MOSFET shutoff circuit of the control board of the inverter, the PWM signal; receiving, by a first buffer of the control board of the inverter, an output of the primary shutoff path circuit; receiving, by a second buffer of the control board of the inverter, an output of the upper MOSFET shutoff circuit; receiving, by a third buffer of the control board of the inverter, an output of the lower MOSFET shutoff circuit; receiving, by the microprocessor, a first feedback signal from the first buffer by a first resistor and a second resistor provided in parallel at the first buffer; receiving, by the microprocessor, a second feedback signal from the second buffer by a third resistor and a fourth resistor provided in parallel at the second buffer; and receiving, by the microprocessor, a third feedback signal from the third buffer by a fifth resistor and a sixth resistor provided in parallel at the third buffer.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to a safety mechanism to meet ASIL-D requirements for an inverter and, more particularly, to providing a safety mechanism with minimal additional hardware to meet ASIL-D requirements for an inverter.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices Q1-Q6 may be described as switches or devices, but may refer to any device capable of controlling the flow of power in an electrical circuit. For example, devices Q1-Q6 may be metal—oxide—semiconductor field-effect transistors (MOSFETs), bipolar junction transistors (BJTs), insulated-gate bipolar transistors (IGBTs), or relays, for example, or any combination thereof, but are not limited thereto.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

A basic inverter system includes a control circuit board and a power circuit board. The control circuit board includes safety logic circuits, shutoff circuits, and buffers which process Pulse-Width Modulation (PWM) signals to control a motor. The power board includes power Metal-Oxide-Semiconductor Field-Effect Transistors (MOSFETs) which are connected to the motor. The PWM signals control the switching on and switching off of the power MOSFETs. Because current automotive manufacturers are increasingly moving towards achieving functional safety, the inverter system includes safety logic and a shutoff circuit to achieve the functional safety.

An example inverter may include three shutoff circuits which will force the inverter to go into a safe state in case there is any fault which would lead to violation of the safety goals. However, a problem arises when there is a component failure (single point or latent point failure) in either the safety logic circuits or the shutoff circuits which will lead to a violation of the safety goals. Hence, the inverter may be forced to go into a safe state when it is not intended to do so. For example, the inverter may be forced into Active Short Circuit (ASC) mode or Free Wheeling (FW) mode. In ASC mode, some or all of the phase windings of the motor are intentionally shorted using the power MOSFETs of the inverter, and can be established with different switch positions of the power MOSFETs. In FW mode, the PWM to all the phase windings are cut off completely. These failures may abruptly turn off the motor, which is not the intended operation.

In order to achieve ASIL-D compliance, an inverter must have a Failure In Time (FIT) rate less than 10 (the number of failures that can be expected in one billion device-hours of operation), which is very stringent for single point & latent point failures. Accordingly, a safety mechanism which would mitigate these unintended faults is needed. One safety mechanism may include providing a redundant circuit for the safety logic circuits and/or the shutoff circuits, which leads to an increase in cost.

Figure 1:
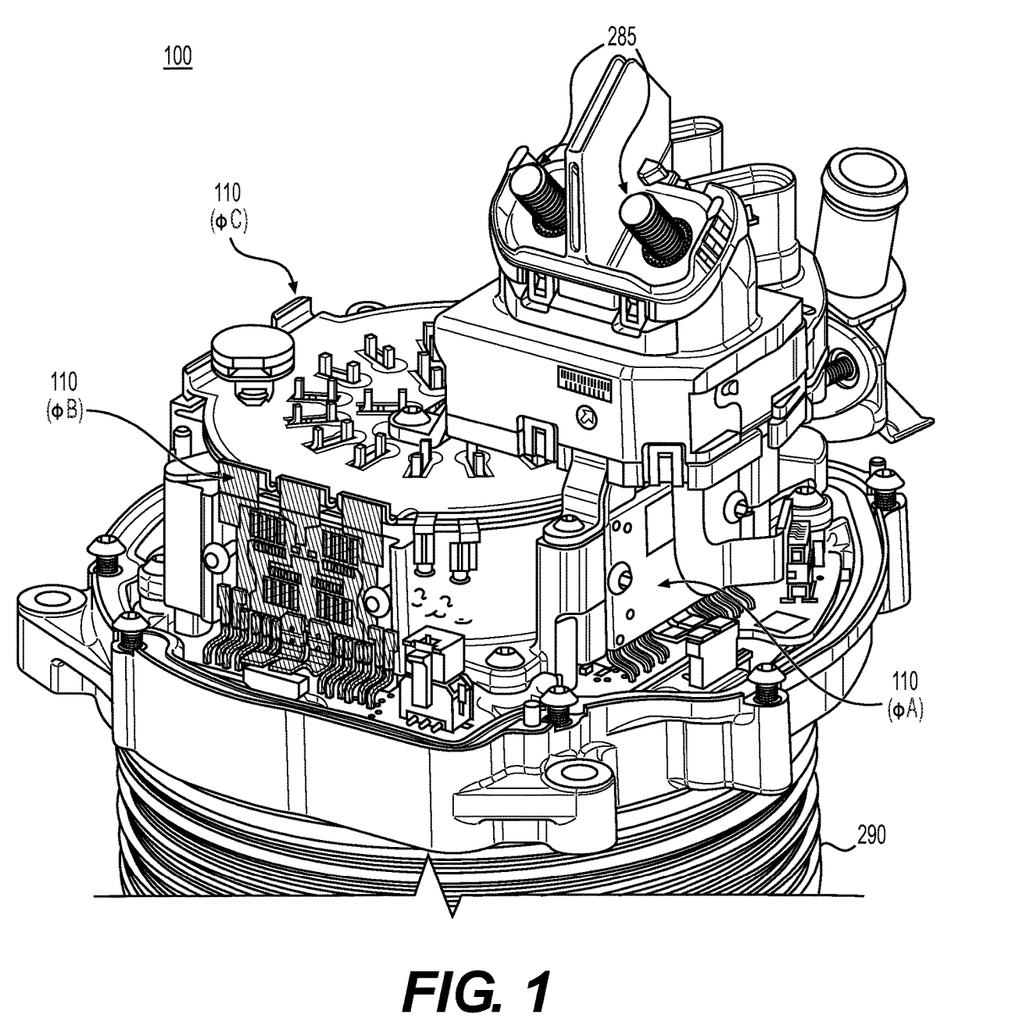
FIG. 1 depicts a three phase inverter module, according to one or more embodiments.
Figure 2:
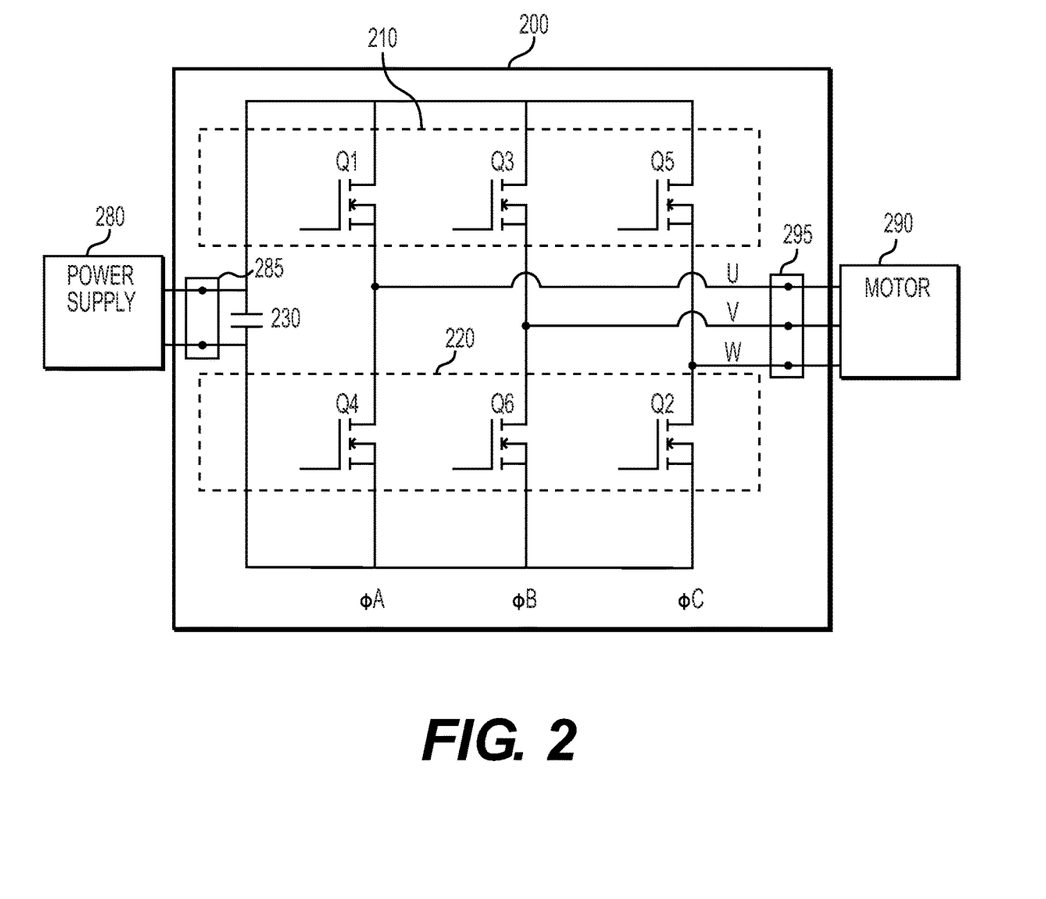
FIG. 2 depicts an electrical power schematic of a three phase inverter module in a connected system, according to one or more embodiments.

FIG. 1 depicts a three phase inverter module, according to one or more embodiments. FIG. 2 depicts an electrical power schematic of a three phase inverter module, according to one or more embodiments. The three phase inverter module may be used in an electric vehicle, for example, but the embodiments are not limited thereto.

As shown in FIGS. 1 and 2, a three phase inverter module 100 may include heat sink 110 and power board 200, and may be connected to a power supply 280 and a motor 290. Power board 200 may include first three-phase switch group 210, and second three-phase switch group 220. A first phase U may correlate with ϕA including switches Q1 and Q4, a second phase V may correlate with ϕB including switches Q3 and Q6, and a third phase W may correlate with ϕC including switches Q5 and Q2, as illustrated in FIG. 2. First three-phase switch group 210 may include first phase switch Q1, second phase switch Q3, and third phase switch Q5. Second three-phase switch group 220 may include first phase switch Q4, second phase switch Q6, and third phase switch Q2. Switches Q1-Q6 may be metal-oxide-semiconductor field-effect transistors (MOSFET), for example, but are not limited thereto.

The first three-phase switch group 210 and second three-phase switch group 220 may be driven by a PWM signal generated by inverter controller 300 (shown in FIG. 3) to convert DC power delivered via input terminal set 285 at capacitor 230 to three phase AC power at outputs U, V, and W via output terminal set 295 to motor 290. Additionally, although FIGS. 1 and 2 illustrate a three-phase inverter, the disclosure is not limited thereto, and may include single phase or multi-phase inverters.

Figure 3:
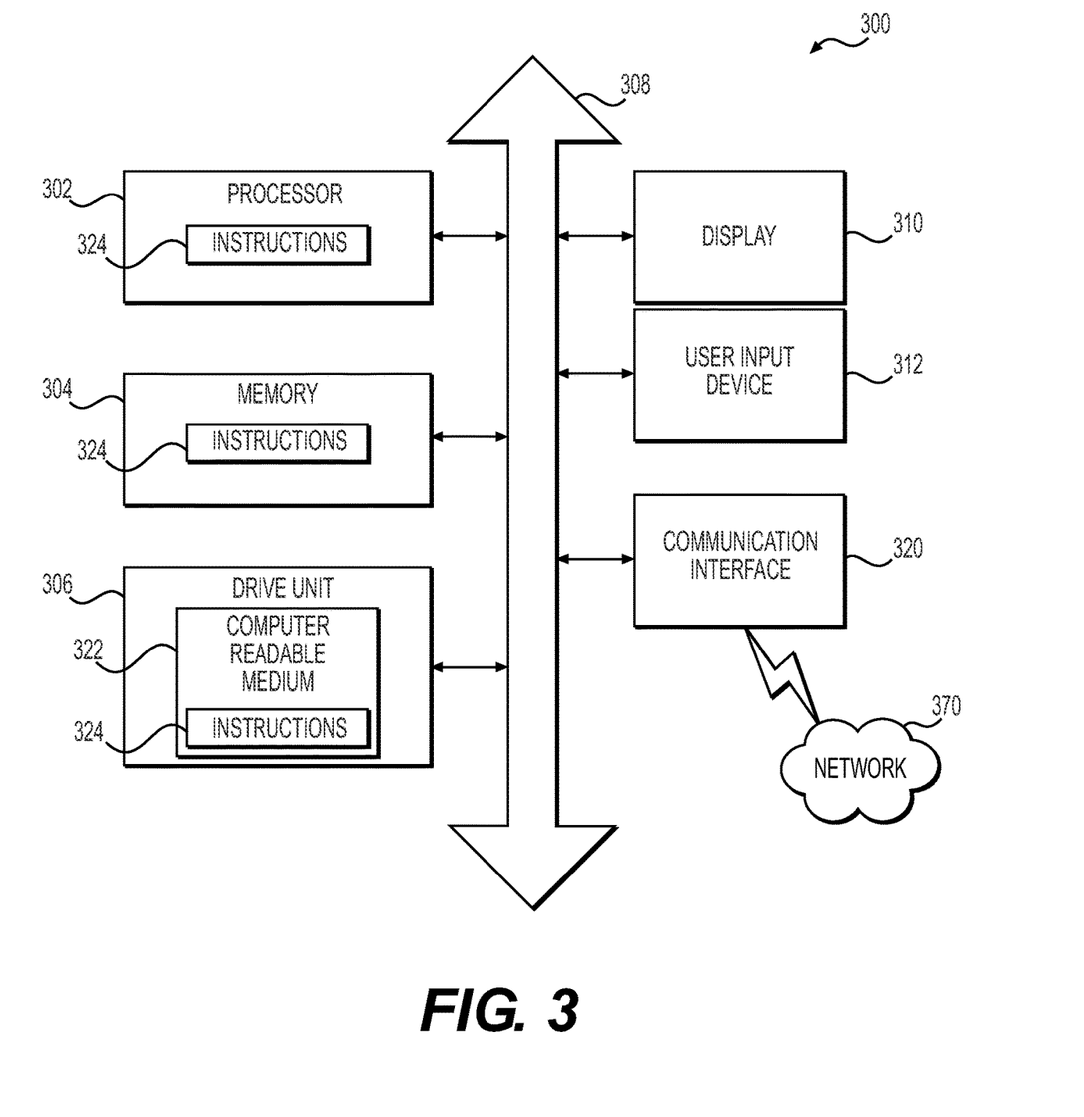
FIG. 3 depicts an implementation of a computer system that may execute techniques presented herein, according to one or more embodiments.

FIG. 3 depicts an implementation of an inverter controller 300 that may execute techniques presented herein, according to one or more embodiments.

The inverter controller 300 may include a set of instructions that can be executed to cause the inverter controller 300 to perform any one or more of the methods or computer based functions disclosed herein. The inverter controller 300 may operate as a standalone device or may be connected, e.g., using a network, to other computer systems or peripheral devices.

In a networked deployment, the inverter controller 300 may operate in the capacity of a server or as a client in a server-client user network environment, or as a peer computer system in a peer-to-peer (or distributed) network environment. The inverter controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the inverter controller 300 can be implemented using electronic devices that provide voice, video, or data communication. Further, while the inverter controller 300 is illustrated as a single system, the term "system" shall also be taken to include any collection of systems or sub-systems that individually or jointly execute a set, or multiple sets, of instructions to perform one or more computer functions.

As illustrated in FIG. 3, the inverter controller 300 may include a processor 302, e.g., a central processing unit (CPU), a graphics processing unit (GPU), or both. The processor 302 may be a component in a variety of systems. For example, the processor 302 may be part of a standard inverter. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The inverter controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the inverter controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the inverter controller 300 may include an input device 312 configured to allow a user to interact with any of the components of inverter controller 300. The input device 312 may be a number pad, a keyboard, or a cursor control device, such as a mouse, or a joystick, touch screen display, remote control, or any other device operative to interact with the inverter controller 300.

The inverter controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the inverter controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in inverter controller 300, or combinations thereof. The connection with the network 370 may be a physical connection, such as a wired Ethernet connection or may be established wirelessly as discussed below. Likewise, the additional connections with other components of the inverter controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The inverter controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
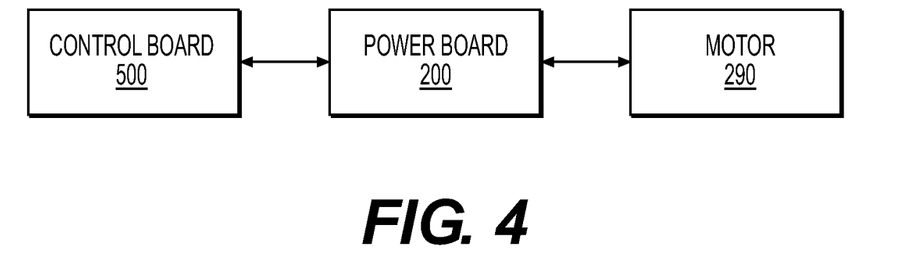
FIG. 4 depicts a connected system including a control board, a power board, and a motor, according to one or more embodiments.

FIG. 4 depicts a connected system including a control board 500, a power board 200, and a motor 290, according to one or more embodiments. The control board 500 may, among other functions, generate a PWM signal and monitor a status of various components. The power board 200 may include the first three-phase switch group 210 and second three-phase switch group 220, which may be driven by the PWM signal generated by inverter controller 300 to convert DC power delivered via input terminal set 285 at capacitor 230 to three phase AC power at outputs U, V, and W via output terminal set 295 to motor 290.

Figure 5:
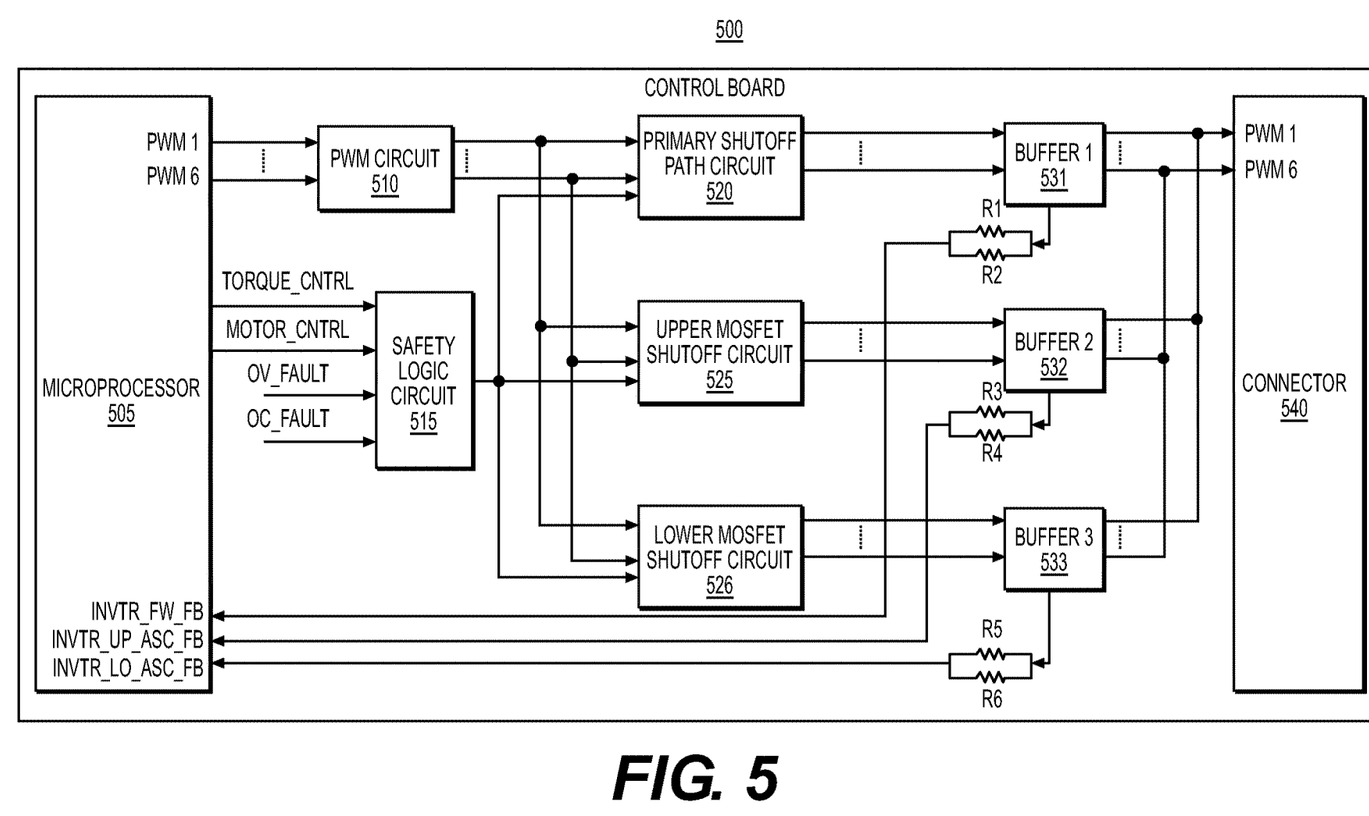
FIG. 5 depicts an electrical schematic for the control board, according to one or more embodiments.

FIG. 5 depicts an electrical schematic for the control board 500, according to one or more embodiments.

As shown in FIG. 5, the control board 500 may be a component of inverter controller 300, and may include microprocessor 505, PWM circuit 510, safety logic circuit 515, primary shutoff path circuit 520, upper MOSFET shutoff circuit 525, lower MOSFET shutoff circuit 526, buffer 1 (531), buffer 2 (532), buffer 3 (533), and connector 540.

Microprocessor 505 sends PWM signals PWM 1 and PWM 6 to PWM circuit 510, sends signals TORQUE_CNTRL and MOTOR_CNTRL to safety logic circuit 515, and receives feedback signals INVTR_FW_FB, INVTR_UP_ASC_FB, and INVTR_LO_ASC_FB from buffer 1 (531), buffer 2 (532), and buffer 3 (533), respectively.

PWM circuit 510 receives PWM signals PWM 1 and PWM 6 from microprocessor 505, and sends signals to primary shutoff path circuit 520, upper MOSFET shutoff circuit 525, and lower MOSFET shutoff circuit 526.

Safety logic circuit 515 receives signals TORQUE_CNTRL and MOTOR_CNTRL from microprocessor 505, receives signals OV_FAULT and OC_FAULT, and sends signals to primary shutoff path circuit 520, upper MOSFET shutoff circuit 525, and lower MOSFET shutoff circuit 526. Signals TORQUE_CNTRL and MOTOR_CNTRL may be used to control (e.g. increase or decrease, based on position and speed sensing, for example) torque and motor speed. Both may be directly proportional, so that if one is increased, the other increases, and vice versa. OV_FAULT and OC_FAULT may be received by safety logic circuit 515 from power board 200, and may be provided as feedback from the power board 200 based on an overvoltage or overcurrent on the power board 200.

Primary shutoff path circuit 520 receives signals from PWM circuit 510 and safety logic circuit 515, and sends signals to buffer 1 (531). Upper MOSFET shutoff circuit 525 receives signals from PWM circuit 510 and safety logic circuit 515, and sends signals to buffer 2 (532). Lower MOSFET shutoff circuit 526 receives signals from PWM circuit 510 and safety logic circuit 515, and sends signals to buffer 3 (533).

Buffer 1 (531) receives signals from primary shutoff path circuit 520 and sends signals to the power board 200 through connector 540. Resistors R1 and R2 are provided in parallel to avoid a single point of failure, and provide a feedback signal INVTR_FW_FB from buffer 1 (531) to microprocessor 505.

Buffer 2 (532) receives signals from upper MOSFET shutoff circuit 525 and sends signals to the power board 200 through connector 540. Resistors R3 and R4 are provided in parallel to avoid a single point of failure, and provide a feedback signal NVTR_UP_ASC_FB from buffer 2 (532) to microprocessor 505.

Buffer 3 (533) receives signals from lower MOSFET shutoff circuit 526 and sends signals to the power board 200 through connector 540. Resistors R5 and R6 are provided in parallel to avoid a single point of failure, and provide a feedback signal INVTR_LO_ASC_FB from buffer 3 (533) to microprocessor 505.

FIG. 5 illustrates PWM signals (PWM 1 and PWM 6) sent to the power board 200 through connector 540. However, there are many other signals passing through connector 540, such as fault signals, power, and ground, for example.

As shown in FIG. 5 and discussed above, if any component in the control board 500 fails, the feedback signals INVTR_FW_FB, INVTR_UP_ASC_FB, and INVTR_LOASC_FB from buffer 1 (531), buffer 2 (532), and buffer 3 (533), respectively indicate to the microprocessor 505 that some component in the control board 500 has failed and the microprocessor 505 should prepare the inverter to enter a safe state (either ASC mode or FW mode) depending on a speed of the motor 290. This system uses software in the microprocessor 505 to sense the feedback signals, which may result in only a minimal component cost increase relative to a substantially hardware-based solution.

Figure 6:
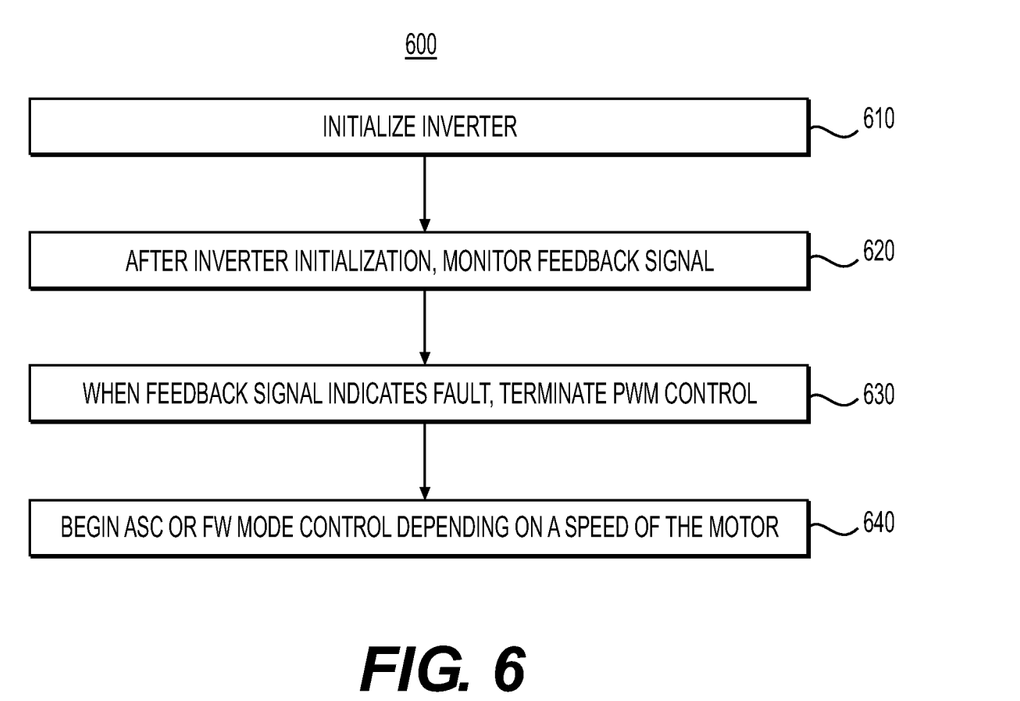
FIG. 6 depicts a method for determining a fault in the inverter, according to one or more embodiments.

FIG. 6 depicts a method 600 for determining a fault in the inverter, according to one or more embodiments.

In operation 610, the inverter is initialized in a startup process, and feedback signals INVTR_FW_FB, INVTR_UP_ASC_FB, and INVTR_LO_ASC_FB from buffer 1 (531), buffer 2 (532), and buffer 3 (533), respectively are ignored by microprocessor 505.

In operation 620, after completion of startup process, the feedback signals are monitored by microprocessor 505, either continuously or at specific time intervals depending on the throughput of the microprocessor 505. For example, during normal operation, the feedback signals may be in a low state such as 0V, for example. In the event a fault occurs in any circuit prior to any of buffer 1 (531), buffer 2 (532), and buffer 3 (533), (as the feedback signals are sensed from the input of the buffers) the respective feedback signal is pulled up to a high state such as 5V, for example. The fault may be any resistor or capacitor being in an open circuit or short circuit condition, which may be due to transient effects or component age, for example. The fault may also be an integrated circuit pin opened internally due to static discharge or being shorted to an adjacent pin due to static discharge. Although not limited thereto, the fault may be a single point fault, as the requirement for ASIL-D emphasizes single point failures.

In operation 630, when one or more of feedback signals INVTR_FW_FB, INVTR_UP_ASC_FB, and INVTR_LO_ASC_FB from buffer 1 (531), buffer 2 (532), and buffer 3 (533), respectively, indicates a fault, PWM control is terminated.

In operation 640, microprocessor 505 enables the respective MOSFETs to reflect FW mode or ASC mode based on a threshold value, such as a speed of the motor 290. If any fault is detected in any circuit on the control board prior to buffer 1 (531), buffer 2 (532), and buffer 3 (533), the microprocessor 505 may prepare the unit to push the motor 290 into a safe state. Based on a speed of the motor 290 and the kind of fault detected, the motor 290 may be pushed into a safe state such as the ASC (active short circuit) mode or FW (Free Wheeling) mode, for example.

According to an embodiment, the feedback signals do not involve any hardware components (e.g. redundant logic circuits) other than the six resistors R1-R6 used to provide feedback signals from the buffer inputs. Because software is used to push the inverter into a safe state, the FIT rate is greatly reduced relative to a hardware solution.

According to an embodiment, the inverter is not forced to go into a safe state when the inverter is not intended to do so. For example, the inverter is not forced into Active Short Circuit (ASC) mode or Free Wheeling (FW) mode. Accordingly, according to an embodiment, component failures do not abruptly turn off the motor.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system including a control board for a direct-current (DC) to alternating current (AC) inverter, the control board comprising:
   a microprocessor configured to output a Pulse Width Modulation (PWM) signal;
   a primary shutoff path circuit configured to receive the PWM signal;
   an upper MOSFET shutoff circuit configured to receive the PWM signal;
   a lower MOSFET shutoff circuit configured to receive the PWM signal;
   a first buffer provided at an output of the primary shutoff path circuit;
   a second buffer provided at an output of the upper MOSFET shutoff circuit;
   a third buffer provided at an output of the lower MOSFET shutoff circuit;
   a first resistor and a second resistor provided in parallel at the first buffer and configured to provide a first feedback signal from the first buffer to the microprocessor;
   a third resistor and a fourth resistor provided in parallel at the second buffer and configured to provide a second feedback signal from the second buffer to the microprocessor; and
   a fifth resistor and a sixth resistor provided in parallel at the third buffer and configured to provide a third feedback signal from the third buffer to the microprocessor.

2. The system of claim 1, wherein the microprocessor is configured to ignore the first feedback signal, the second feedback signal, and the third feedback signal during an initialization period when the inverter is initialized in a startup process.

3. The system of claim 2, wherein the microprocessor is configured to monitor, following the initialization period, the first feedback signal, the second feedback signal, and the third feedback signal either continuously or at specific time intervals.

4. The system of claim 1, wherein the first feedback signal, the second feedback signal, and the third feedback signal are in a low state during normal operation, and are in a high state when a fault occurs in any circuit on the control board prior to any of the first buffer, the second buffer, and the third buffer.

5. The system of claim 1, wherein when one or more of the first feedback signal, the second feedback signal, or the third feedback signal indicates a fault, the microprocessor is configured to terminate PWM control.

6. The system of claim 5, wherein the microprocessor is further configured to enable Active Short Circuit (ASC) mode or Free Wheeling (FW) mode based on a threshold value.

7. The system of claim 6, wherein the threshold value is a speed of a motor controlled by the inverter.

8. The system of claim 1, wherein the control board further comprises:
   a PWM circuit configured to receive the PWM signal from the microprocessor and output the PWM signal to the primary shutoff path circuit, the upper MOSFET shutoff circuit, and the lower MOSFET shutoff circuit; and
   a safety logic circuit configured to receive first control signals from the microprocessor and provide second control signals to the primary shutoff path circuit, the upper MOSFET shutoff circuit, and the lower MOSFET shutoff circuit.

9. A direct-current (DC) to alternating current (AC) inverter comprising:
   the system of claim 1; and
   a power board configured to receive PWM signals from the first PWM buffer, the second PWM buffer, and the third PWM buffer and generate alternating current (AC) power using the received PWM signals.

10. An electrical system comprising:
the inverter of claim 9; and
a motor configured to receive the generated AC power from the power board of the inverter, and to rotate based on the received AC power.

11. A method for controlling a direct-current (DC) to alternating current (AC) inverter, the method comprising:
outputting, from a microprocessor of a control board of the inverter, a Pulse Width Modulation (PWM) signal;
receiving, by a primary shutoff path circuit of the control board of the inverter, the PWM signal;
receiving, by an upper MOSFET shutoff circuit of the control board of the inverter, the PWM signal;
receiving, by a lower MOSFET shutoff circuit of the control board of the inverter, the PWM signal;
receiving, by a first buffer of the control board of the inverter, an output of the primary shutoff path circuit;
receiving, by a second buffer of the control board of the inverter, an output of the upper MOSFET shutoff circuit;
receiving, by a third buffer of the control board of the inverter, an output of the lower MOSFET shutoff circuit;
receiving, by the microprocessor, a first feedback signal from the first buffer by a first resistor and a second resistor provided in parallel at the first buffer;
receiving, by the microprocessor, a second feedback signal from the second buffer by a third resistor and a fourth resistor provided in parallel at the second buffer; and
receiving, by the microprocessor, a third feedback signal from the third buffer by a fifth resistor and a sixth resistor provided in parallel at the third buffer.

12. The method of claim 11, further comprising:
ignoring, by the microprocessor, the first feedback signal, the second feedback signal, and the third feedback signal during an initialization period when the inverter is initialized in a startup process.

13. The method of claim 12, further comprising:
monitoring, by the microprocessor following the initialization period, the first feedback signal, the second feedback signal, and the third feedback signal either continuously or at specific time intervals.

14. The method of claim 11, wherein the first feedback signal, the second feedback signal, and the third feedback signal are in a low state during normal operation, and are in a high state when a fault occurs in any circuit on the control board prior to any of the first buffer, the second buffer, and the third buffer.

15. The method of claim 11, further comprising:
terminating, by the microprocessor, PWM control when one or more of the first feedback signal, the second feedback signal, or the third feedback signal indicates a fault.

16. The method of claim 15, further comprising:
enabling, by the microprocessor, Active Short Circuit (ASC) mode or Free Wheeling (FW) mode based on a threshold value.

17. The method of claim 16, wherein the threshold value is a speed of a motor controlled by the inverter.

18. The method of claim 11, further comprising:
receiving, by a PWM circuit of the control board, the PWM signal from the microprocessor and outputting the PWM signal to the primary shutoff path circuit, the upper MOSFET shutoff circuit, and the lower MOSFET shutoff circuit; and
receiving, by a safety logic circuit of the control board, first control signals from the microprocessor and providing second control signals to the primary shutoff path circuit, the upper MOSFET shutoff circuit, and the lower MOSFET shutoff circuit.

19. The method of claim 11, further comprising:
receiving, by a power board for the inverter, PWM signals from the first PWM buffer, the second PWM buffer, and the third PWM buffer and generating alternating current (AC) power using the received PWM signals.

20. A non-transitory computer readable medium storing instructions that, when executed by a control board for a direct-current (DC) to alternating current (AC) inverter, perform operations including:
outputting, from a microprocessor of the control board of the inverter, a Pulse Width Modulation (PWM) signal;
receiving, by a primary shutoff path circuit of the control board of the inverter, the PWM signal;
receiving, by an upper MOSFET shutoff circuit of the control board of the inverter, the PWM signal;
receiving, by a lower MOSFET shutoff circuit of the control board of the inverter, the PWM signal;
receiving, by a first buffer of the control board of the inverter, an output of the primary shutoff path circuit;
receiving, by a second buffer of the control board of the inverter, an output of the upper MOSFET shutoff circuit;
receiving, by a third buffer of the control board of the inverter, an output of the lower MOSFET shutoff circuit;
receiving, by the microprocessor, a first feedback signal from the first buffer by a first resistor and a second resistor provided in parallel at the first buffer;
receiving, by the microprocessor, a second feedback signal from the second buffer by a third resistor and a fourth resistor provided in parallel at the second buffer; and
receiving, by the microprocessor, a third feedback signal from the third buffer by a fifth resistor and a sixth resistor provided in parallel at the third buffer.

* * * * *